United States Patent
Mu et al.

(10) Patent No.: US 11,965,821 B1
(45) Date of Patent: Apr. 23, 2024

(54) OPTICAL FIBER SENSING SYSTEM FOR TEMPERATURE AND SALINITY SYNCHRONOUS MEASUREMENT

(71) Applicant: GUANGDONG OCEAN UNIVERSITY, Guangdong (CN)

(72) Inventors: Xiaoguang Mu, Zhanjiang (CN); Lin Sun, Zhanjiang (CN); Yuying Zhang, Zhanjiang (CN); Yuting Li, Zhanjiang (CN); Kun Song, Zhanjiang (CN); Jiale Gao, Zhanjiang (CN); Yuqiang Yang, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 18/456,486

(22) Filed: Aug. 26, 2023

Related U.S. Application Data

(63) Continuation of application No. PCT/CN2023/104776, filed on Jun. 30, 2023.

(30) Foreign Application Priority Data

Apr. 12, 2023 (CN) .......................... 202310383311.X

(51) Int. Cl.
  *G01N 21/17* (2006.01)
  *G01J 5/0821* (2022.01)
(52) U.S. Cl.
  CPC ............ *G01N 21/17* (2013.01); *G01J 5/0821* (2013.01); *G01N 2021/1734* (2013.01)
(58) Field of Classification Search
  CPC ............ G01N 21/17; G01N 2021/1734; G01J 5/0821
  See application file for complete search history.

(56) References Cited

U.S. PATENT DOCUMENTS

| 10,725,373 B1* | 7/2020 | Kumar ...................... G02B 1/02 |
| 2014/0180030 A1* | 6/2014 | Dorando .............. A61B 5/0215 |
| | | 600/301 |

(Continued)

FOREIGN PATENT DOCUMENTS

| CN | 108507697 A | 9/2018 |
| CN | 109142278 A | 1/2019 |

(Continued)

OTHER PUBLICATIONS

Simultaneous Measurement of Seawater Salinity and Temperature With Composite Fiber-Optic Interferometer; Zhao et al., IEEE TIM 71 (Year: 2022).*

(Continued)

*Primary Examiner* — Mohamed K Amara
(74) *Attorney, Agent, or Firm* — Piloff Passino & Cosenza LLP; Sean A. Passino; Rachel K. Piloff

(57) ABSTRACT

An optical fiber sensing system for temperature and salinity synchronous measurement is provided, which includes a broad-spectrum light source, an optical fiber circulator, a coupler, a first interferometer, a second interferometer, a third interferometer and a spectrometer; the first interferometer is insensitive to temperature and salinity; the second interferometer is sensitive to both temperature and salinity, and the third interferometer is only sensitive to temperature; light emitted by the broad-spectrum light source passes through the optical fiber circulator and enters the first interferometer; reflected light of the first interferometer passes through the optical fiber circulator and the coupler sequentially, and then enters the second and the third interferometers respectively; the reflected light of the second and the third interferometers enters the spectrometer after passing through the coupler; the temperature and the salinity to be measured are simultaneously obtained by performing (Continued)

spectral analysis of the reflected light entering the spectrometer.

7 Claims, 12 Drawing Sheets

(56) References Cited

U.S. PATENT DOCUMENTS

| | | | | |
|---|---|---|---|---|
| 2014/0180031 A1* | 6/2014 | Anderson | ............... | A61B 8/06 600/478 |
| 2016/0062009 A1* | 3/2016 | Wach | ................. | G02B 5/285 427/164 |
| 2019/0011253 A1* | 1/2019 | Ding | ................... | G02B 6/2935 |
| 2021/0018431 A1* | 1/2021 | Viegas | ................. | G01K 11/32 |
| 2023/0184596 A1 | 6/2023 | Liu | | |
| 2023/0266291 A1* | 8/2023 | Myrick | ................ | H10K 30/00 |

FOREIGN PATENT DOCUMENTS

| | | | | |
|---|---|---|---|---|
| CN | 110057307 A | | 7/2019 | |
| CN | 111238554 A | | 6/2020 | |
| CN | 111707302 A | * | 9/2020 | ............ G01D 5/353 |
| CN | 112781633 A | | 5/2021 | |
| CN | 113008406 A | | 6/2021 | |
| CN | 113029381 A | | 6/2021 | |
| CN | 113074830 A | | 7/2021 | |
| CN | 218002459 U | | 12/2022 | |
| CN | 115597658 A | | 1/2023 | |
| WO | 2019186448 A1 | | 10/2019 | |

OTHER PUBLICATIONS

Advanced Fiber Sensors Based on the Vernier Effect; Chen et al., Sensors, 22, 2694 (Year: 2022).*
Optical fibre Fabry-Pérot interferometer based on inline microcavities for salinity and temperature sensing; Flores et al.,. Nature Scientific Reports, 9:9556 (Year: 2019).*
First Office Action for China Application No. 202310383311.X, dated May 13, 2023.
Xu Tingting et al., "Cascaded Double-Cavity Temperature Sensor Based on Hollow Fibers Encapsulated by PDMS Membrane," Journal of Optics, Apr. 25, 2022.
Jiang Zejun, "Research on Optical Fiber Dual-Parameter Sensor Based on Vernier Effect," A Dissertation Submitted to Guangdong University of Technology for the Master's Degree of Engineering, May 2022.
First Search Report for China Application No. 202310383311.X.
Supplemental Search Report for China Application No. 202310383311.X.
Notice to Grant for China Application No. 202310383311.X, dated May 31, 2023.

* cited by examiner

OPTICAL FIBER SENSING SYSTEM FOR TEMPERATURE AND SALINITY SYNCHRONOUS MEASUREMENT

CROSS-REFERENCE TO RELATED APPLICATIONS

This application is a continuation of PCT/CN2023/104776, filed on Jun. 30, 2023, and claims priority of Chinese Patent Application No. 202310383311.X, filed on Apr. 12, 2023, the entire contents of which are incorporated herein by reference.

TECHNICAL FIELD

The application belongs to the technical field of optical fiber sensing, and in particular to an optical fiber sensing system for temperature and salinity synchronous measurement.

BACKGROUND

The optical fiber sensor has the advantages of high precision, anti-electromagnetic interference, low costs and easy reuse, and therefore is widely used in various fields. The optical fiber Fabry-Perot sensor stands out among many sensors for the advantages of simple fabrication, high sensitivity, a small size, easy packaging and high integration. The optical fiber Fabry-Perot sensor may directly interact with seawater to produce the interference, and may be used in the field of marine environmental monitoring.

However, the sensitivity of a single Fabry-Perot interferometer is limited, and temperature and salinity synchronous measurement is impossible. Therefore, it is urgent to propose a new type of seawater temperature and salinity sensor with multi-cavity structure, which may produce the optical vernier effect, improve the sensitivity by the amplification of the vernier effect, and realize the temperature and salinity synchronous measurement.

SUMMARY

In order to solve the above technical problems, the application provides an optical fiber sensing system for temperature and salinity synchronous measurement, and designs a series-parallel structure of three Fabry-Perot interferometers, which may not only produce the vernier effect, but also realize the temperature and salinity double-parameter measurement.

In order to achieve the above objective, the application provides an optical fiber sensing system for temperature and salinity synchronous measurement, including a broad-spectrum light source, an optical fiber circulator, a coupler, a first interferometer, a second interferometer, a third interferometer and a spectrometer;
the first interferometer is connected in series with the optical fiber circulator and the coupler in sequence; the coupler is respectively connected with the second interferometer, the third interferometer and the spectrometer; and the second interferometer is connected in parallel with the third interferometer;
the first interferometer is insensitive to the temperature and the salinity; the second interferometer is sensitive to both the temperature and the salinity, and the third interferometer is only sensitive to the temperature;
light emitted by the broad-spectrum light source passes through the optical fiber circulator and enters the first interferometer; reflected light of the first interferometer passes through the optical fiber circulator and the coupler in sequence, and then enters the second interferometer and the third interferometer respectively; reflected light of the second interferometer and the third interferometer enters the spectrometer after passing through the coupler; the temperature to be measured and the salinity to be measured are simultaneously obtained by performing a spectral analysis of reflected light entering the spectrometer.

Optionally, the first interferometer includes a single-mode optical fiber, a hollow optical fiber and a single-mode optical fiber concentrically welded in sequence.

Optionally, the second interferometer includes three single-mode optical fibers we de in a staggered manner in sequence; where the single-mode optical fiber in the middle of the three single-mode optical fibers is welded with the other two single-mode optical fibers at both ends in the staggered manner.

Optionally, the third interferometer includes the single-mode optical fiber and the hollow optical fiber concentrically welded; where the hollow optical fiber includes an air cavity formed after injecting polydimethylsiloxane; an optical path of the air cavity is a preset multiple of an optical path of the first interferometer, so that a vernier effect between the first interferometer and the third interferometer is generated.

Optionally, the spectral analysis of the reflected light entering the spectrometer includes:
respectively obtaining interference spectra of the first interferometer, the second interferometer and the third interferometer based on the reflected light entering the spectrometer;
obtaining a first interference spectra envelope between the first interferometer and the second interferometer based on the interference spectrum of the first interferometer and the interference spectrum of the second interferometer; obtaining a second interference spectra envelope between the first interferometer and the third interferometer based on the interference spectrum of the first interferometer and the interference spectrum of the third interferometer; and
obtaining the temperature to be measured and the salinity to be measured based on the first interference spectra envelope and the second interference spectra envelope.

Optionally, obtaining the temperature and the salinity includes:
obtaining a first translation amount of the first interference spectra envelope and a second translation amount of the second interference spectra envelope when the temperature and the salinity change; and
obtaining the temperature to be measured and the salinity to be measured based on the first translation amount and the second translation amount.

Optionally, the interference spectra of the first interferometer, the second interferometer and the third interferometer are as follows:

$$I_{12}(\lambda) = I_1 + I_2 - 2\sqrt{I_1 I_2} \cos\left(\frac{4\pi n_1 L_1}{\lambda}\right)$$

$$I_{34}(\lambda) = I_3 + I_4 - 2\sqrt{I_3 I_4} \cos\left(\frac{4\pi n_2 L_2}{\lambda}\right)$$

$$I_{56}(\lambda) = I_5 + I_6 - 2\sqrt{I_5 I_6} \cos\left(\frac{4\pi n_3 L_3}{\lambda}\right)$$

where $I_{12}(\lambda)$ is the interference spectrum of the first interferometer; $I_{34}(\lambda)$ is the interference spectrum of the second interferometer; $I_{56}(\lambda)$ is the interference spectrum of the third interferometer; $I_1$ and $I_2$ are light intensities of the two beams of the reflected light of the first interferometer, respectively; $I_3$ and $I_4$ are light intensities of the two beams of the reflected light of the second interferometer, respectively; $I_5$ and $I_6$ are light intensities of the two beams of the reflected light of the third interferometer, respectively; $L_1$, $L_2$ and $L_3$ are cavity lengths of the first interferometer, the second interferometer and the third interferometer respectively; $n_1$, $n_2$ and $n_3$ are refractive indices of intracavity media of the first interferometer, the second interferometer and the third interferometer respectively; and $\lambda$ is a wavelength of incident light.

Optionally, the first interference spectra envelope is:

$$\begin{cases} I_{en-12}(\lambda) = E_{12}\cos\left(\dfrac{4\pi n_1 L_1}{M_{12}\lambda}\right) \\ M_{12} = \dfrac{FSR_1}{|FSR_1 - FSR_2|} = \dfrac{n_1 L_1}{|n_1 L_1 - n_2 L_2|} \end{cases}$$

where $I_{en-12}(\lambda)$ is the first interference spectra envelope, $E_{12}$ is an amplitude of the interference spectra envelope, and $M_{12}$ is a magnification of a vernier effect between the first interferometer and the second interferometer;

the second interference spectra envelope is:

$$\begin{cases} I_{en-13}(\lambda) = E_{13}\cos\left(\dfrac{4\pi n_1 L_1}{M_{13}\lambda}\right) \\ M_{13} = \dfrac{FSR_1}{|FSR_1 - FSR_3|} = \dfrac{n_1 L_1}{|n_1 L_1 - n_3 L_3|} \end{cases}$$

where $I_{en-13}(\lambda)$ is the second interference spectra envelope, and $E_{13}$ is the amplitude of the interference spectra envelope; $M_{13}$ is a magnification of the vernier effect between the first interferometer and the third interferometer, and wherein $FSR_1$, $FSR_2$ and $FSR_3$ represent a free spectral region of the first, second and third interferometers, respectively.

Optionally, the first translation amount and the second translation amount are respectively:

$$\begin{cases} \Delta\lambda_{12} = \alpha_1 \Delta T + \beta_1 \Delta S \\ \Delta\lambda_{13} = \alpha_2 \Delta T + \beta_2 \Delta S \end{cases}$$

where $\Delta T$ and $\Delta S$ respectively represent variations of the temperature and the salinity relative to calibration points, $\Delta\lambda_{12}$ is the first translation amount, $\Delta\lambda_{13}$ is the second translation amount, $\alpha_1$ and $\beta_1$ are temperature sensitivity and salinity sensitivity of the first interference spectra envelope respectively, and $\alpha_2$ and $\beta_2$ are temperature sensitivity and salinity sensitivity of the second interference spectra envelope respectively;

the temperature to be measured and the salinity to be measured are respectively:

$$\begin{cases} T = T_0 + \Delta T \\ S = S_0 + \Delta S \end{cases}$$

where T is the temperature to be measured, S is the salinity to be measured, $T_0$ is the temperature of the calibration points, and $S_0$ is the salinity of the calibration points.

Compared with the prior art, the embodiment has the following advantages and technical effects.

The embodiment provides an optical fiber sensing system for temperature and salinity synchronous measurement, which includes three interferometers connected in series and parallel, and the first interferometer generates the vernier effect with the second interferometer and the third interferometer respectively; through the spectral analysis of the complex interference spectra received by the spectrometer, two interference spectra envelopes produced by different vernier effects are obtained, and then the relationship matrix between the translation amount of the two interference spectra envelopes and the temperature and the salinity is established. The temperature and salinity synchronous measurement is realized by solving the relationship matrix. The sensor not only improves the sensitivity by using the vernier effect, but also realizes the temperature and salinity synchronous measurement.

BRIEF DESCRIPTION OF THE DRAWINGS

The attached drawings, which constitute a part of the present application, are used to provide a further understanding of the present application. The illustrative embodiments of the present application and the descriptions are used to explain the present application, and do not constitute an improper limitation of the present application. In the drawings.

DETAILED DESCRIPTION OF THE EMBODIMENTS

Figure 1:
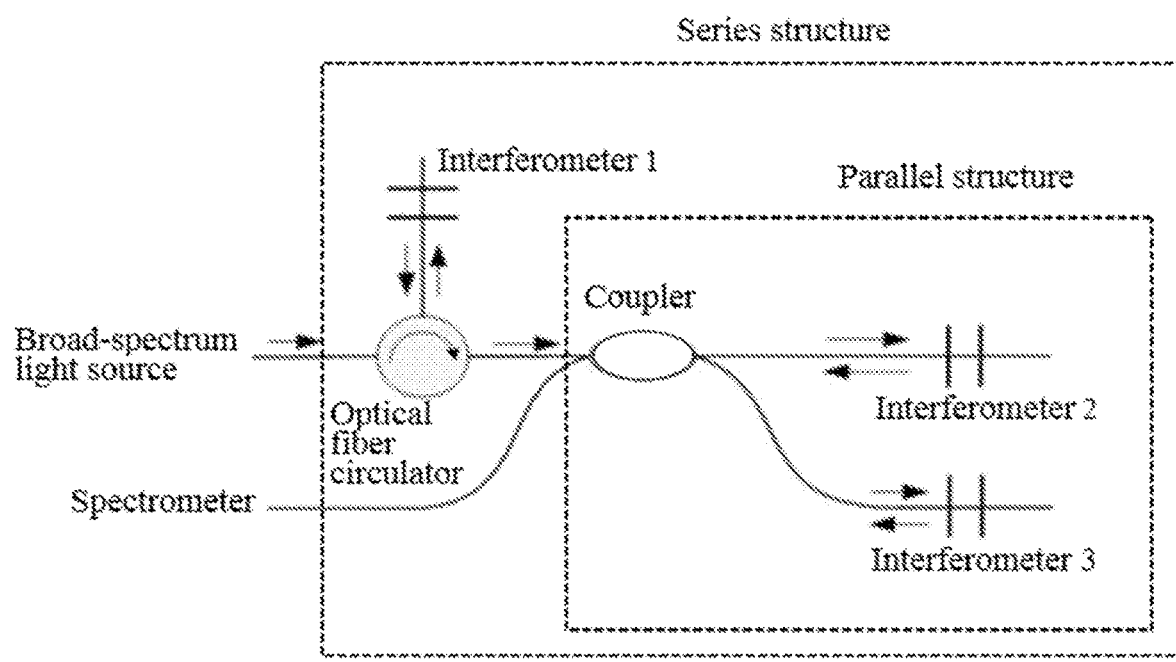
FIG. 1 is a schematic structural diagram of an optical fiber sensing system according to an embodiment of the present application.

It should be noted that the embodiments in the present application and the features in the embodiments may be combined with each other without conflict. The present application will be described in detail with reference to the attached drawings and embodiments.

It should be noted that the steps shown in the flowchart of the drawings may be executed in a computer system such as a set of computer-executable instructions, and although the logical order is shown in the flowchart, in some cases, the steps shown or described may be executed in an order different from here.

The application provides an optical fiber sensing system for temperature and salinity synchronous measurement, including a broad-spectrum light source, an optical fiber circulator, a coupler, a first interferometer, a second interferometer, a third interferometer and a spectrometer.

The first interferometer is connected in series with the optical fiber circulator and the coupler in sequence; the coupler is respectively connected with the second interferometer, the third interferometer and the spectrometer; the second interferometer is connected in parallel with the third interferometer.

The first interferometer is insensitive to the temperature and the salinity; the second interferometer is sensitive to both the temperature and the salinity, and the third interferometer is only sensitive to the temperature.

The light emitted by the broad-spectrum light source passes through the optical fiber circulator and enters the first interferometer; reflected light of the first interferometer passes through the optical fiber circulator and the coupler in sequence, and then enters the second interferometer and the third interferometer respectively; reflected light of the second interferometer and the third interferometer enters the spectrometer after passing through the coupler; the temperature to be measured and the salinity to be measured are simultaneously obtained by performing a spectral analysis of reflected light entering the spectrometer.

Further, the first interferometer includes a single-mode optical fiber, a hollow optical fiber and a single-mode optical fiber concentrically welded in sequence.

Optionally, the second interferometer includes three single-mode optical fibers welded in a staggered manner in sequence; where the single-mode optical fiber in the middle of the three single-mode optical fibers is welded with the other two single-mode optical fibers at both ends in the staggered manner.

Further, the third interferometer includes the single-mode optical fiber and the hollow optical fiber concentrically welded; where, the hollow optical fiber includes an air cavity formed after injecting polydimethylsiloxane; an optical path of the air cavity is a preset multiple of an optical path of the first interferometer, so that a vernier effect between the first interferometer and the third interferometer is generated.

Further, the spectral analysis of the reflected light entering the spectrometer includes:
respectively obtaining interference spectra of the first interferometer, the second interferometer and the third interferometer based on the reflected light entering the spectrometer;
obtaining a first interference spectra envelope between the first interferometer and the second interferometer based on the interference spectrum of the first interferometer and the interference spectrum of the second interferometer; obtaining a second interference spectra envelope between the first interferometer and the third interferometer based on the interference spectrum of the first interferometer and the interference spectrum of the third interferometer; and
obtaining the temperature to be measured and the salinity to be measured based on the first interference spectra envelope and the second interference spectra envelope.

Further, obtaining the temperature and the salinity includes:
obtaining a first translation amount of the first interference spectra envelope and a second translation amount of the second interference spectra envelope when the temperature and the salinity change; and
obtaining the temperature to be measured and the salinity to be measured based on the first translation amount and the second translation amount.

The sensitivity of a single Fabry-Perot interferometer is limited. In this embodiment, in order to improve the sensitivity of the optical fiber sensor, two interferometers are used to with close but unequal free spectral ranges in series or parallel to produce optical vernier effect, thus using the amplification of the vernier effect to improve the sensitivity. In order to realize the temperature and salinity synchronous measurement, a series-parallel structure of three Fabry-Perot interferometers is designed in this embodiment. This structure may not only produce the vernier effect, but also realize the temperature and salinity synchronous measurement.

Polydimethylsiloxane (PDMS) is a kind of material which is extremely sensitive to the temperature. The PDMS will have the effect of thermal expansion and cold contraction when the temperature changes, and has good light transmittance and refraction. The high thermal expansion and high thermal light characteristics of PDMS are combined with the optical fiber, which may change the length of the cavity at different temperatures and improve the sensitivity of temperature measurement.

This embodiment proposes an optical fiber sensor for temperature and salinity synchronous measurement, which is composed of three interferometers with different structures connected in series and parallel. As shown in FIG. 1, interferometer 1 is formed by sequentially welding a single-mode optical fiber, a hollow optical fiber and a single-mode optical fiber. The interference cavity is closed and insensitive to temperature and the salinity, and serves as a reference cavity. Interferometer 2 is made of the single-mode optical fibers welded in a staggered manner, and the interference cavity is an open structure, which is sensitive to the temperature and the salinity. Interferometer 3 is formed by filling PDMS into the hollow fiber, one end of the hollow fiber is welded with the single-mode fiber, and the interferometer cavity is a closed cavity and sensitive to the temperature. The interferometer 1 is in series with the interferometer 2 and the interferometer 3, and the interferometer 2 and the interferometer 3 are in parallel. The interferometer 1 and the interferometer 2 and the interferometer 3 respectively produce the vernier effect. The spectrometer receives the interference spectra of signal light after passing through three interferometers, so the interference spectra are more complex. In order to obtain the interference spectra envelopes between the interferometer 1 and the interferometer 2 and between the interferometer 1 and the interferometer 3, in this application, firstly the spectral analysis is performed on the complex interference spectra obtained by the spectrometer to reconstruct the interference spectra of three interferometers, and then the interference spectra envelope between the interferometer 1 and the interferometer 2 is obtained and the interference spectra envelope between the interferometer 1 and the interferometer 3 by means of respective superposition of the interference spectra. According to the translation amount of two interference spectra envelopes relative to the experimental calibration interference spectra envelope (corresponding to specific temperature and salinity), the relationship matrix among the translation amount of interference spectra and temperature and salinity is established, and the temperature and salinity synchronous measurement is realized by solving the relationship matrix.

As shown in FIG. 1, the optical fiber sensing system for temperature and salinity synchronous measurement proposed in this embodiment is composed of a broad-spectrum light source (1400 nm-1600 nm), an optical fiber circulator, an interferometer 1, an interferometer 2, an interferometer 3, a coupler and a spectrometer. The light emitted by the light source passes through the optical fiber circulator and enters the interferometer 1 (the interferometer 1 is insensitive to temperature and the salinity and is as a reference interferometer). After the reflected light of the interferometer 1 passes through the optical fiber circulator and the optical fiber coupler, one part of the light enters the interferometer 2 (interferometer 2 is sensitive to the temperature and the salinity) and the other part of the light enters the interferometer 3 (the interferometer 3 is sensitive to the temperature). The reflected light of the interferometer 2 and the interferometer 3 is received by the spectrometer after passing through the coupler. The spectra received by the spectrometer are complex interference spectra with three interferometers connected in series and parallel. In order to obtain the interference spectra envelope produced by the vernier effect, it is necessary to perform a frequency-domain analysis for the complex interference spectra measured by the spectrometer. The interference spectra of three interferometers are reconstructed, and then the interference spectra envelope between the interferometer 1 and the interferometer 2 and the interference spectra envelope between the interferometer 1 and the interferometer 3 are obtained by superposition of interference spectra.

Figure 2A:
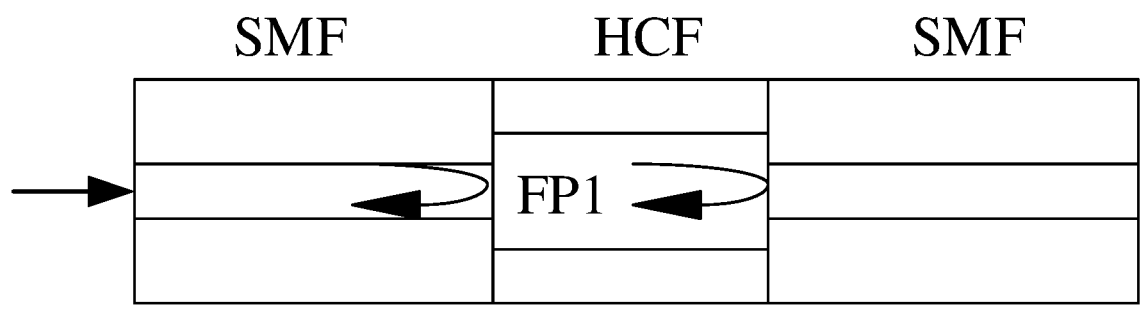
FIG. 2A is a schematic structural diagram of a sensing head of the interferometer 1 according to the embodiment of the present application.
Figure 2B:
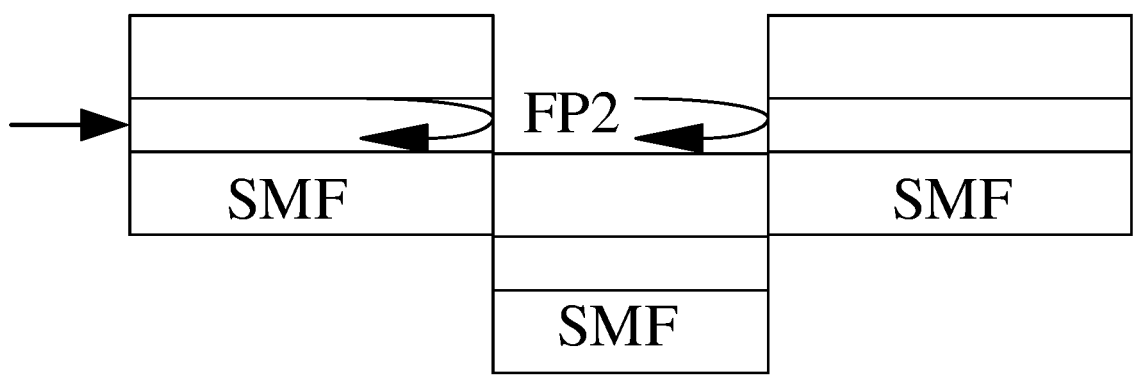
FIG. 2B is a schematic structural diagram of a sensor head of the interferometer 2 according to the embodiment of the present application.
Figure 2C:
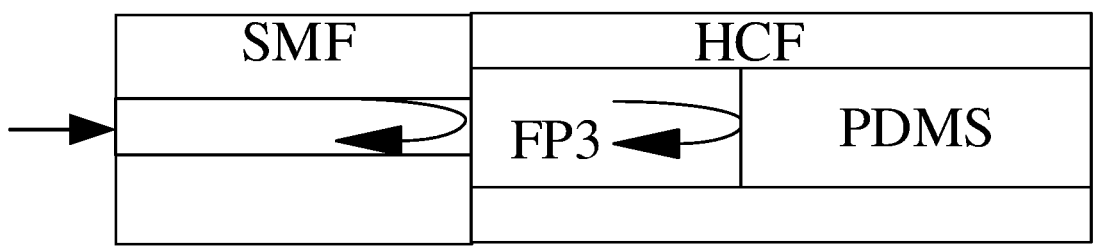
FIG. 2C is a schematic structural diagram of a sensor head of the interferometer 3 according to the embodiment of the present application.

The sensor head structures of three different interferometers in the sensor system model of this embodiment are shown in FIG. 2A, FIG. 2B and FIG. 2C. FIG. 2A shows the sensor head structure of the interferometer 1, FIG. 2B shows the sensor head structure of the interferometer 2, and FIG. 2C shows the sensor head structure of the interferometer 3.

The preparation process of the sensing system is as follow:

The interferometer 1 (reference cavity FP1) is formed by sequentially welding a single-mode optical fiber, a hollow fiber and a single-mode optical fiber (The diameter of the single-mode optical fiber is 125 microns, and the diameter of fiber core is 8-10 microns. The outer diameter of the hollow fiber is 125 microns and the inner diameter of the hollow fiber is 50 microns).

The interferometer 2 (sensing cavity FP2) is made of three single-mode optical fibers welded in a staggered manner, and the staggered amount is 65.5-67.5 microns. The optical path of the interferometer 2 is about 0.90-0.99 times that of the interferometer 1 to ensure the vernier effect between the interferometer 1 and the interferometer 2.

The interferometer 3 (sensing cavity FP3) is formed by welding the single-mode optical fiber and the hollow optical fiber, and injecting PDMS into the hollow optical fiber to form an air cavity (interferometer FP3). The optical path of the air cavity is about 1.01-1.1 times that of the interferometer 1 to ensure the vernier effect between the interferometer 1 and the interferometer 3.

The beam transmission process and sensing principle are as follows:

As shown in FIG. 1, the incident light emitted by the broad-spectrum light source enters the interferometer 1 through the circulator, and then the incident light enters the interferometer 2 and the interferometer 3 through the optical fiber circulator and the optical fiber coupler after being reflected by the interferometer 1; after that the incident light is reflected by the interferometer 2 and the interferometer 3, and is received by the spectrometer.

The interference spectra of the interferometer 1, the interferometer 2 and the interferometer 3 may be expressed as follows:

$$I_{12}(\lambda) = I_1 + I_2 - 2\sqrt{I_1 I_2} \cos\left(\frac{4\pi n_1 L_1}{\lambda}\right)$$

$$I_{34}(\lambda) = I_3 + I_4 - 2\sqrt{I_3 I_4} \cos\left(\frac{4\pi n_2 L_2}{\lambda}\right)$$

$$I_{56}(\lambda) = I_5 + I_6 - 2\sqrt{I_5 I_6} \cos\left(\frac{4\pi n_3 L_3}{\lambda}\right)$$

where $I_1$ and $I_2$ are the light intensities of the two beams of the reflected light of the interferometer 1, respectively; $I_3$ and $I_4$ are the light intensities of the two beams of the reflected light of the interferometer 2, respectively; $I_5$ and $I_6$ are the light intensities of the two beams of the reflected light of the interferometer 3, respectively; $L_1$, $L_2$ and $L_3$ are the cavity lengths of the interferometer 1, the interferometer 2 and the interferometer 3 respectively; $n_1$, $n_2$, and $n_3$ are the refractive indices of intracavity media of the interferometer 1, the interferometer 2, and the interferometer 3, respectively. The interference spectra received by the spectrometer are complex interference spectra by the superposition of three interference spectra, which may be approximately expressed as:

$$I=I_1(\lambda)+I_2(\lambda)+I_3(\lambda).$$

The free spectral ranges of interferometer 1, the interferometer 2 and the interferometer 3 may be expressed as follows:

$$FSR_1 = \frac{\lambda^2}{2n_1 L_1}$$

$$FSR_2 = \frac{\lambda^2}{2n_2 L_2}$$

$$FSR_3 = \frac{\lambda^2}{2n_3 L_3}$$

Because the free spectral ranges of the interferometer 1 and the interferometer 2 are close but not equal, there will be a vernier effect between the interferometer 1 and the interferometer 2, and the interference spectra envelope $I_{en-12}$ presented thereby may be expressed as follows:

$$\begin{cases} I_{en-12}(\lambda) = E_{12}\cos\left(\frac{4\pi n_1 L_1}{M_{12}\lambda}\right) \\ M_{12} = \frac{FSR_1}{|FSR_1 - FSR_2|} = \frac{n_1 L_1}{|n_1 L_1 - n_2 L_2|} \end{cases}$$

where $E_{12}$ is the amplitude of the interference spectra envelope; $M_{12}$ is the magnification of the vernier effect between the interferometer 1 and the interferometer 2, and the sensitivity of temperature and salinity of the interference spectra envelope $I_{en-12}$ is $M_{13}$ times that of a single interferometer 2.

Because the free spectral ranges of the interferometer 1 and the interferometer 3 are close but not equal, there will be a vernier effect between the interferometer 1 and the interferometer 3, and the interference spectra envelope $I_{en-13}$ presented thereby may be expressed as follows:

$$\begin{cases} I_{en-13}(\lambda) = E_{13}\cos\left(\dfrac{4\pi n_1 L_1}{M_{13}\lambda}\right) \\ M_{13} = \dfrac{FSR_1}{|FSR_1 - FSR_3|} = \dfrac{n_1 L_1}{|n_1 L_1 - n_3 L_3|} \end{cases}$$

where $E_{13}$ is the amplitude of the interference spectra envelope; $M_{13}$ is the magnification of the vernier effect between the interferometer 1 and the interferometer 3, and the temperature sensitivity of the interference spectra envelope $I_{en-13}$ is $M_{13}$ times that of a single interferometer 3.

Because the spectrometer obtains the complex interference spectra of the light source through the series-parallel structure of three interferometers, in order to obtain the interference spectra envelope $I_{en-12}$ and the interference spectra envelope $I_{en-13}$, it is necessary to perform a spectral analysis for the complex interference spectra to obtain the interference spectra of the three interferometers, and then obtain the interference spectra envelopes $I_{en-12}$ and $I_{en-13}$ by the superposition of the interference spectra.

When the temperature and salinity change, the translation amounts $\Delta\lambda_{12}$ and $\Delta\lambda_{13}$ of the interference spectra envelopes $I_{en-12}$ and $I_{en-13}$ may be expressed as follows:

$$\begin{cases} \Delta\lambda_{12} = \alpha_1 \Delta T + \beta_1 \Delta S \\ \Delta\lambda_{13} = \alpha_2 \Delta T + \beta_2 \Delta S \end{cases}$$

The corresponding matrix equation may be expressed as follows:

$$\begin{bmatrix} \Delta\lambda_{12} \\ \Delta\lambda_{13} \end{bmatrix} = \begin{bmatrix} \alpha_1 & \beta_1 \\ \alpha_2 & \beta_2 \end{bmatrix} \begin{bmatrix} \Delta T \\ \Delta S \end{bmatrix}$$

where $\Delta T$ and $\Delta S$ respectively represent the changes of temperature and salinity relative to the calibration points ($T_0$, $S_0$), and the calibration point refers to the reference point of the sensor, which correspond to the specific temperature, salinity, the first interference spectra envelope and the second interference spectra envelope. The first translation amount and the second translation amount are relative to the peak (or trough) wavelength of the interference spectra envelope corresponding to the reference points. $\Delta\lambda_{12}$ and $\Delta\lambda_{13}$ are the translation amounts of the interference spectra envelopes $I_{en-12}$ and $I_{en-13}$ relative to the calibration points, respectively; $\alpha_1$ and $\beta_1$ are the temperature sensitivity and salinity sensitivity of the interference spectra envelope $I_{en-12}$ respectively, which are constants and may be measured by experiments. $\alpha_2$ and $\beta_2$ are the temperature sensitivity and salinity sensitivity of the interference spectra envelope $I_{en-13}$ respectively, which are constants and may be measured by experiments. By solving the matrix equation, the temperature T to be measured and the salinity S to be measured may be obtained as follows:

$$\begin{cases} T = T_0 + \Delta T \\ S = S_0 + \Delta S \end{cases}$$

Figure 3:
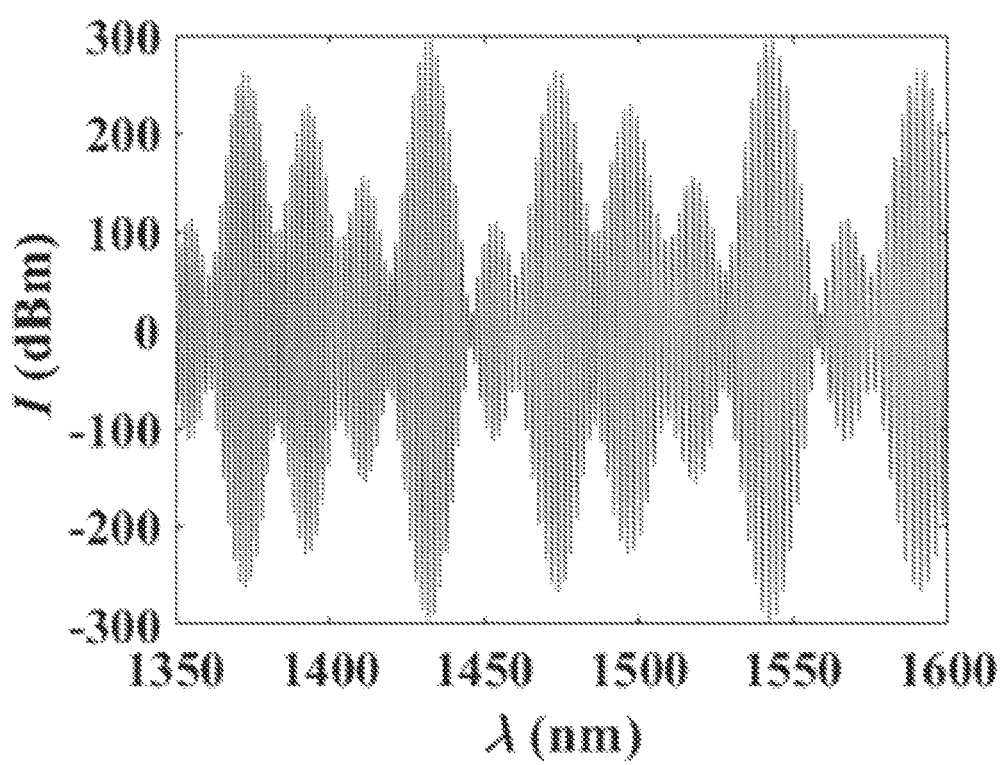
FIG. 3 is a schematic diagram of a complex multi-cavity interference spectra according to the embodiment of the present application.
Figure 4A:
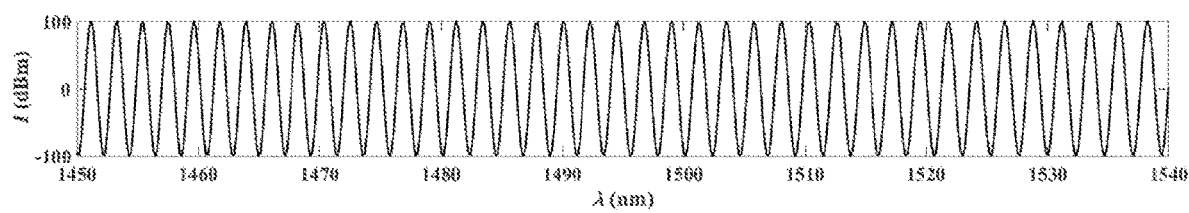
FIG. 4A is a schematic diagram of the interference spectrum of the interferometer 1 according to the embodiment of the present application.
Figure 4B:
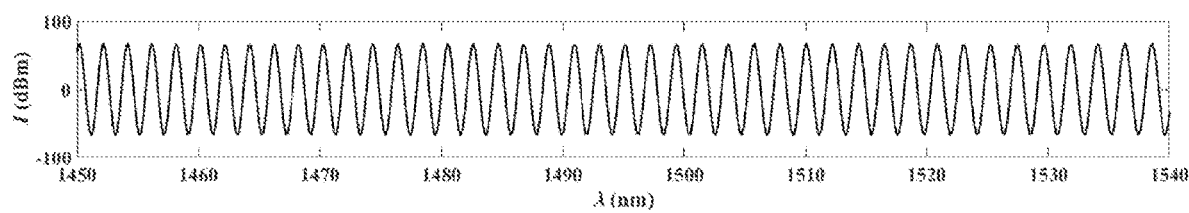
FIG. 4B is a schematic diagram of the interference spectrum of the interferometer 2 according to the embodiment of the present application.
Figure 4C:
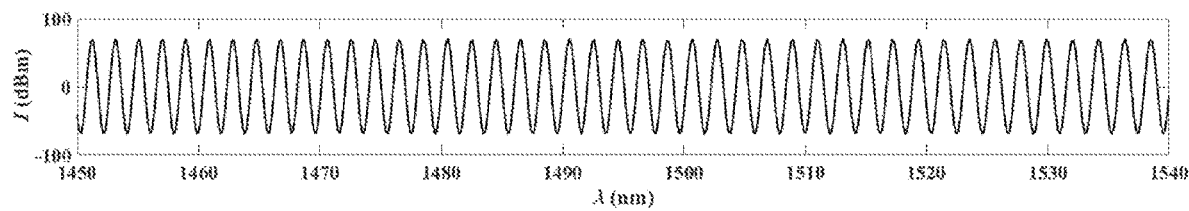
FIG. 4C is a schematic diagram of the interference spectrum of the interferometer 3 according to the embodiment of the present application.

The received complex interference spectra after multi-cavity coupling is as shown in FIG. 3, so the spectral analysis may be performed for the complex interference spectra by Fourier transform, and the interference spectra of each cavity $I_1(\lambda)$, $I_2(\lambda)$ and $I_3(\lambda)$ are extracted, as shown in FIG. 4A, FIG. 4B and FIG. 4C. The free spectral ranges of the three interferometers are very close and unequal, which may produce the vernier effect in cascade. FIG. 4A shows the interference spectrum of the interferometer 1, FIG. 4B shows the interference spectrum of the interferometer 2, and FIG. 4C shows the interference spectra of the interferometer 3.

Figure 5A:
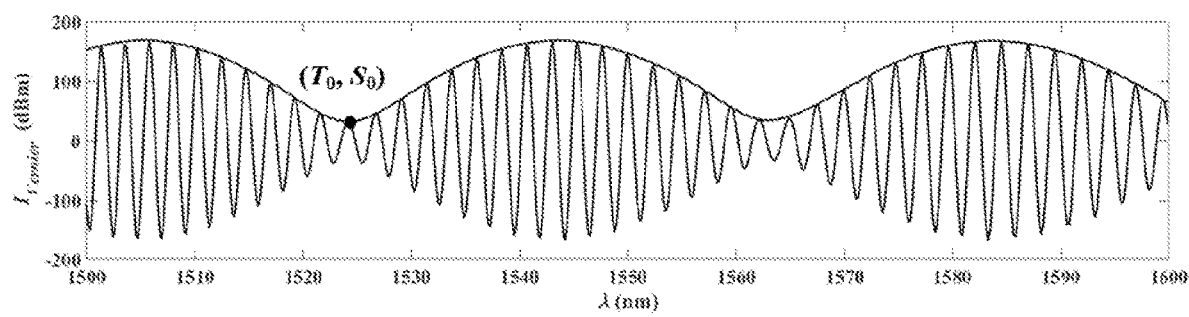
FIG. 5A is a schematic diagram of the calibration temperature and calibration salinity of the interference spectra envelope $I_{en-12}$ according to the embodiment of the present application.
Figure 5B:
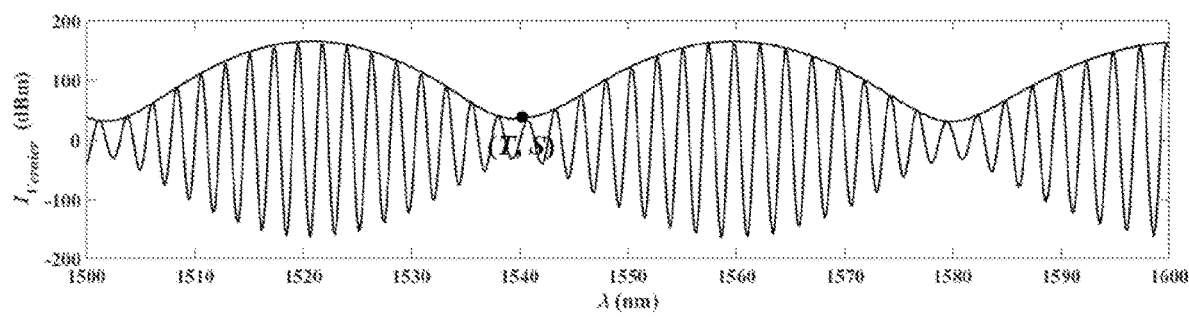
FIG. 5B is a schematic diagram of the temperature to be measured and the salinity to be measured of the interference spectra envelope $I_{en-12}$ according to the embodiment of the present application.

FIG. 5A and FIG. 5B are schematic diagrams of the calibration temperature and the calibration salinity, and the temperature to be measured and the salinity to be measured of the interference spectra envelope $I_{en-12}$ of this embodiment. FIG. 5A shows the calibration temperature and the calibration salinity of the interference spectra envelope $I_{en-12}$, and FIG. 5B shows the temperature to be measured and the salinity to be measured.

Figure 6A:
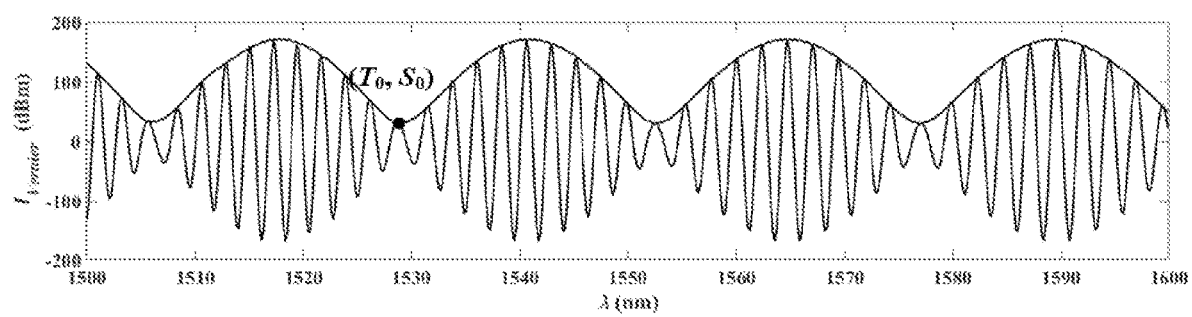
FIG. 6A is a schematic diagram of the calibration temperature and calibration salinity of the interference spectra envelope $I_{en-13}$ according to the embodiment of the present application.
Figure 6B:
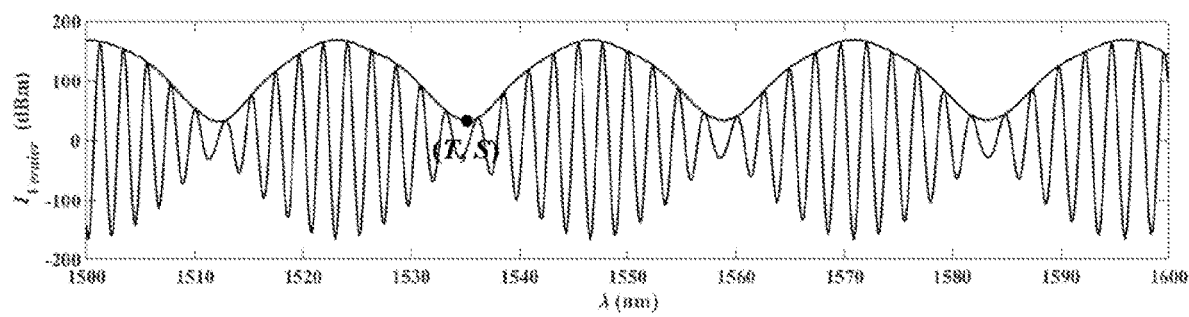
FIG. 6B is a schematic diagram of the temperature to be measured and the salinity to be measured of the interference spectra envelope $I_{en-13}$ according to the embodiment of the present application.

FIG. 6A and FIG. 6B are schematic diagrams of the calibration temperature and the calibration salinity, and the temperature to be measured and the salinity to be measured of the interference spectra envelope $I_{en-13}$ of this embodiment. FIG. 6A shows the calibration temperature and the calibration salinity of the interference spectra envelope $I_{en-13}$, and FIG. 6B shows the temperature to be measured and the salinity to be measured.

The above is only the preferred embodiments of this application, but the protection scope of this application is not limited to this. Any changes or replacements that may be easily thought of by a person skilled in the art within the technical scope disclosed in this application may be included in the protection scope of this application. Therefore, the protection scope of this application may be based on the protection scope of the claims.

What is claimed is:

1. An optical fiber sensing system for temperature and salinity synchronous measurement, comprising a broad-spectrum light source, an optical fiber circulator, a coupler, a first interferometer, a second interferometer, a third interferometer and a spectrometer;

wherein the first interferometer is connected in series with the optical fiber circulator and the coupler in sequence; the coupler is respectively connected with the second interferometer, the third interferometer and the spectrometer; the second interferometer is connected in parallel with the third interferometer;

the first interferometer is insensitive to the temperature and the salinity; the second interferometer is sensitive to both the temperature and the salinity, and the third interferometer is only sensitive to the temperature;

light emitted by the broad-spectrum light source passes through the optical fiber circulator and enters the first interferometer; reflected light of the first interferometer passes through the optical fiber circulator and the coupler in sequence, and then enters the second interferometer and the third interferometer respectively; reflected light of the second interferometer and the third interferometer enters the spectrometer after passing through the coupler; and the temperature to be measured and the salinity to be measured are simultaneously obtained by performing a spectral analysis of the reflected light entering the spectrometer;

the spectral analysis of the reflected light entering the spectrometer comprises:

respectively obtaining interference spectra of the first interferometer, the second interferometer and the third interferometer based on the reflected light entering the spectrometer;

obtaining a first interference spectra envelope between the first interferometer and the second interferometer based on the interference spectrum of the first interferometer and the interference spectrum of the second interferometer; obtaining a second interference spectra envelope between the first interferometer and the third interferometer based on the interference spectrum of the first interferometer and the interference spectrum of the third interferometer; and obtaining the temperature to be measured and the salinity to be measured based on the first interference spectra envelope and the second interference spectra envelope; and obtaining the temperature and the salinity comprises:

obtaining a first translation amount of the first interference spectra envelope and a second translation amount of the second interference spectra envelope when the temperature and the salinity change; and obtaining the temperature to be measured and the salinity to be measured based on the first translation amount and the second translation amount.

2. The optical fiber sensing system for temperature and salinity synchronous measurement according to claim 1, wherein the first interferometer comprises a single-mode optical fiber, a hollow optical fiber and a single-mode optical fiber concentrically welded in sequence.

3. The optical fiber sensing system for temperature and salinity synchronous measurement according to claim 1, wherein the second interferometer comprises three single-mode optical fibers welded in a staggered manner in sequence; and a single-mode optical fiber in the middle of the three single-mode optical fibers is welded with the other two single-mode optical fibers at both ends in the staggered manner.

4. The optical fiber sensing system for temperature and salinity synchronous measurement according to claim 1, wherein the third interferometer comprises a single-mode optical fiber and a hollow optical fiber concentrically welded; the hollow optical fiber comprises an air cavity formed after injecting polydimethylsiloxane; and an optical path of the air cavity I s a preset multiple of an optical path of the first interferometer, so a vernier effect between the first interferometer and the third interferometer is generated.

5. The optical fiber sensing system for temperature and salinity synchronous measurement according to claim 1, wherein the interference spectra of the first interferometer, the second interferometer and the third interferometer are as follows:

$$I_{12}(\lambda) = I_1 + I_2 - 2\sqrt{I_1 I_2} \cos\left(\frac{4\pi n_1 L_1}{\lambda}\right)$$

$$I_{34}(\lambda) = I_3 + I_4 - 2\sqrt{I_3 I_4} \cos\left(\frac{4\pi n_2 L_2}{\lambda}\right)$$

$$I_{56}(\lambda) = I_5 + I_6 - 2\sqrt{I_5 I_6} \cos\left(\frac{4\pi n_3 L_3}{\lambda}\right)$$

wherein $I_{12}(\lambda)$ is the interference spectrum of the first interferometer; $I_{34}(\lambda)$ is the interference spectrum of the second interferometer; $I_{56}(\lambda)$ is the interference spectrum of the third interferometer; $I_1$ and $I_2$ are light intensities of two beams of the reflected light of the first interferometer, respectively; $I_3$ and $I_4$ are light intensities of two beams of the reflected light of the second interferometer, respectively; $I_5$ and $I_6$ are light intensities of the two beams of the reflected light of the third interferometer, respectively; $L_1$, $L_2$ and $L_3$ are cavity lengths of the first interferometer, the second interferometer and the third interferometer, respectively; $n_1$, $n_2$ and $n_3$ are refractive indices of intracavity media of the first interferometer, the second interferometer and the third interferometer, respectively; and $\lambda$ is a wavelength of incident light.

6. The optical fiber sensing system for temperature and salinity synchronous measurement according to claim 1, wherein the first interference spectra envelope is:

$$\begin{cases} I_{en-12}(\lambda) = E_{12}\cos\left(\frac{4\pi n_1 L_1}{M_{12}\lambda}\right) \\ M_{12} = \frac{FSR_1}{|FSR_1 - FSR_2|} = \frac{n_1 L_1}{|n_1 L_1 - n_2 L_2|} \end{cases}$$

wherein $I_{en-12}(\lambda)$ is the first interference spectra envelope, $E_{12}$ is an amplitude of the interference spectra envelope, and $M_{12}$ is a magnification of a vernier effect between the first interferometer and the second interferometer; and the second interference spectra envelope is:

$$\begin{cases} I_{en-13}(\lambda) = E_{13}\cos\left(\frac{4\pi n_1 L_1}{M_{13}\lambda}\right) \\ M_{13} = \frac{FSR_1}{|FSR_1 - FSR_3|} = \frac{n_1 L_1}{|n_1 L_1 - n_3 L_3|} \end{cases}$$

wherein $I_{en-13}(\lambda)$ is the second interference spectra envelope, and $E_{13}$ is the amplitude of the interference spectra envelope; and $M_{13}$ is a magnification of the vernier effect between the first interferometer and the third interferometer, and wherein $FSR_1$, $FSR_2$ and $FSR_3$ represent a free spectral region of the first, second and third interferometers, respectively.

7. The optical fiber sensing system for temperature and salinity synchronous measurement according to claim 1, wherein the first translation amount and the second translation amount are respectively:

$$\begin{cases} \Delta\lambda_{12} = \alpha_1 \Delta T + \beta_1 \Delta S \\ \Delta\lambda_{13} = \alpha_2 \Delta T + \beta_2 \Delta S \end{cases}$$

wherein $\Delta T$ and $\Delta S$ respectively represent variations of the temperature and the salinity relative to a calibration points, $\Delta\lambda_{12}$ is the first translation amount, $\Delta\lambda_{13}$ is the second translation amount, $\alpha_1$ and $\beta_1$ are temperature sensitivity and salinity sensitivity of the first interference spectra envelope respectively, and $\alpha_2$ and $\beta_2$ are temperature sensitivity and salinity sensitivity of the second interference spectra envelope respectively; and the temperature to be measured and the salinity to be measured are respectively:

$$\begin{cases} T = T_0 + \Delta T \\ S = S_0 + \Delta S \end{cases}$$

wherein T is the temperature to be measured, S is the salinity to be measured, $T_0$ is a temperature of the calibration points, and $S_0$ is a salinity of the calibration points, and wherein the calibration point refers to the reference point of the sensor, corresponding to the specific temperature, salinity, the first interference spectra envelope and the second interference spectra envelope.

* * * * *